US006599219B2

(12) United States Patent
Pan

(10) Patent No.: US 6,599,219 B2
(45) Date of Patent: Jul. 29, 2003

(54) THREE-SPEED GEAR SHIFTING BOX FOR POWER-DRIVEN TOOLS

(75) Inventor: Yaping Pan, Shanghai (CN)

(73) Assignee: Shanghai Xing Te Hao Industrial Co., Ltd., Shanghai (CN)

(*) Notice: Subject to any disclaimer, the term of this patent is extended or adjusted under 35 U.S.C. 154(b) by 0 days.

(21) Appl. No.: 09/962,389

(22) Filed: Sep. 25, 2001

(65) Prior Publication Data

US 2002/0049111 A1 Apr. 25, 2002

(30) Foreign Application Priority Data

Sep. 26, 2000 (CN) ....................................... 00249399 U

(51) Int. Cl.[7] ........................... F16H 3/44; E21B 17/22; E21B 19/16; E21B 19/18; E21B 3/00

(52) U.S. Cl. ....................... 475/317; 475/290; 475/298; 173/216; 173/217

(58) Field of Search ................................ 475/317, 319, 475/271, 290, 293, 298; 173/15, 216, 217, 176

(56) References Cited

U.S. PATENT DOCUMENTS 3,774,476 A 11/1973 Söhnlein et al. .............. 74/785
3,834,467 A 9/1974 Fuchs .......................... 173/12
4,199,286 A 4/1980 Kirkham ..................... 409/233
4,536,688 A * 8/1985 Roger ........................ 318/490
4,834,192 A 5/1989 Hansson ...................... 173/12
4,869,131 A * 9/1989 Ohmori ...................... 173/178
4,892,013 A * 1/1990 Satoh ......................... 173/178
5,339,908 A * 8/1994 Yokota et al. .............. 173/216
5,624,000 A 4/1997 Miller ........................ 173/216
5,897,454 A * 4/1999 Cannaliato .................. 475/263
5,954,144 A 9/1999 Thames ...................... 173/216
6,093,130 A 7/2000 Buck et al. ................. 475/298
6,401,572 B1 * 6/2002 Provost ..................... 81/57.14

FOREIGN PATENT DOCUMENTS

EP 698 449 A2 2/1996

* cited by examiner

*Primary Examiner*—Sherry Estremsky
*Assistant Examiner*—Tisha D. Lewis
(74) *Attorney, Agent, or Firm*—Greer, Burns & Crain, Ltd.

(57) ABSTRACT

A three-speed gear shifting box for power-driven tools includes a triple gear fitted on an output shaft of an electric motor, and planetary gears are sleeved respectively on three planetary gear shafts of an intermediate gear disk and are meshed respectively with the triple gear and internal gears. A poking spring makes an internal gear regulating ring move and fix one of the internal gears. Gears on the intermediate gear disk mesh with planetary gears on four planetary gear shafts, on the main shaft, and the planetary gears also mesh with the fixed internal gear.

1 Claim, 1 Drawing Sheet

THREE-SPEED GEAR SHIFTING BOX FOR POWER-DRIVEN TOOLS

Figure 1:
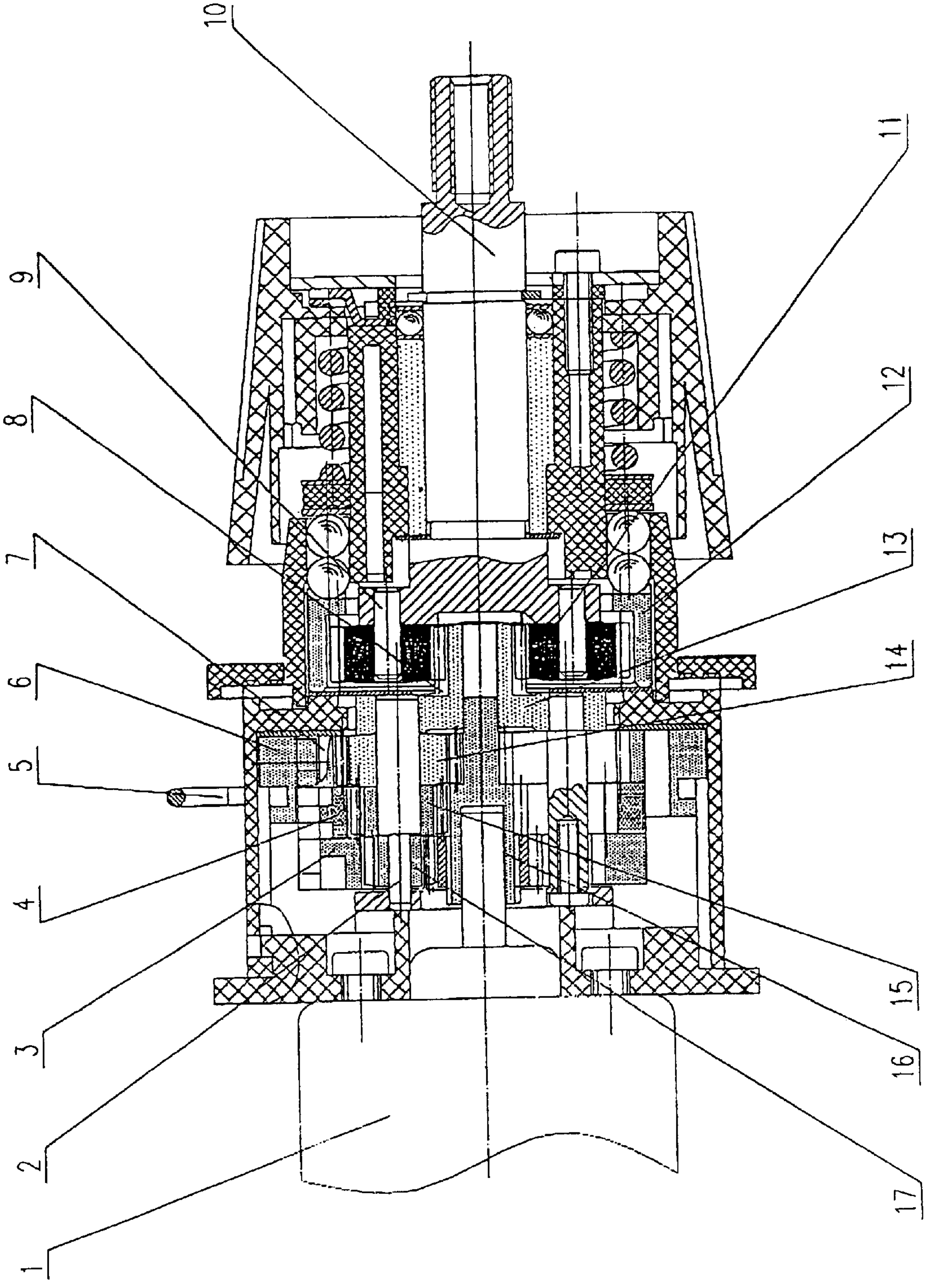

The present utility model relates to the field of power-driven tools, in particular to a novel method in which the three-step speed change, two-stage planetary gear speed reduction are used in the gear box to make the power-driven tool acquire three kinds of transmission ratio outputs.

At present, there are mainly two kinds of speed regulation for the power-driven tool: one relies on speed regulation switch to regulate speed but it reduces rotary speed at the cost of losing torque; the other relies on gear box to reduce speed but it has the choice of only two speeds.

The object of the present utility model is to solve the problem that the power-driven tools relying on gear box can have only two speed transmission. However, this three-speed gear shifting box can make power-driven tools acquire large torque, low rotary speed output and multiple rotary speed choices, being suitable for processing different material.

In order to achieve the above-mentioned objects, the technical scheme adopted is: a triple gear is fitted on the electric motor output shaft of a conventional power-driven tool. Three sets of planetary gears are sleeved respectively on an intermediate gear disk and are meshed respectively with the corresponding triple gear and three internal gears. A poking spring makes an internal gear regulating ring move, and fixes one of the internal gears. The gears on the intermediate gear disk mesh with planetary gears on four planetary gear shafts on a main shaft, and then again planetary gears also mesh with the fixed internal gear.

The present utility model is a combination of two sets of planetary gear which increases the function of large torque and low rotary speed output and simultaneously fixes respectively the internal gear to make gear box increase the function of multiple rotary speed choices and also make the integral structure of the gear box compact.

An embodiment of the present utility model is described in detail with reference to the accompanying drawing.

FIG. 1 is a structural diagram of the present utility model.

As shown in FIG. 1, the output shaft of an existing electric motor is fitted with a triple gear (16). The planetary gears (14), (15), (17) are sleeved respectively on three planetary gear shafts (2) on an intermediate gear disk (13) and are meshed respectively with the triple gear (16) and internal gears (7), (4), (3), a poking spring (5) makes the internal gear regulating ring (6) move to fix one of the internal gears (7), (4), (3). Gears (8) on the intermediate gear disk (13) mesh with planetary gears (11) on four planetary gear shafts (9) on the main shaft (10), and planetary gears (11) also mesh with the fixed internal gear (12).

The poking spring (5) makes the internal gear regulating ring (6) move, so as to fix one of the internal gears (7), (4), (3). The electric motor when rotating makes corresponding planetary gears rotate around the fixed internal gear bringing the intermediate gear disk (13) to rotate, then again the planetary gear (11) are brought to rotate around the fixed internal gear (12) by gears (8) on the intermediate gear disk (13), so as to bring the main shaft (10) to rotate. As the gear teeth number ratios of planetary gears (14), (15), (17) corresponding to internal gears (7), (4), (3) and of the triple gear (16) are different, thus fixing one of the internal gears will make it possible to acquire different transmission ratios.

What is claimed is:

1. A three-speed gear shifting box, comprising a gear box body, a main shaft, electric motor gears and gear shafts for power-driven tools, a triple gear fitted on an output shaft of an electric motor, three sets of planetary gears are sleeved on three planetary gear shafts on an intermediate gear disk and mesh respectively with the triple gear and internal gears, a poking spring is configured to move an internal gear regulating ring and to fix one of the internal gears, a gear on the intermediate gear disk meshes with a set of four planetary gears in a second stage transmission on four planetary gear shafts on the main shaft, the planetary gear set in said second stage transmission also meshes with a fixed internal gear.

* * * * *